(12) United States Patent
Fujiyama

(10) Patent No.: US 7,860,939 B2
(45) Date of Patent: Dec. 28, 2010

(54) SERIAL COMMUNICATION SYSTEM

(75) Inventor: Michihiro Fujiyama, Kyoto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 188 days.

(21) Appl. No.: 12/048,809

(22) Filed: Mar. 14, 2008

(65) Prior Publication Data
US 2008/0225886 A1    Sep. 18, 2008

(30) Foreign Application Priority Data
Mar. 15, 2007    (JP) .............................. 2007-065973

(51) Int. Cl.
*G06F 15/16*    (2006.01)
(52) U.S. Cl. .................................... 709/208
(58) Field of Classification Search ................ None
See application file for complete search history.

(56) References Cited
U.S. PATENT DOCUMENTS
5,737,630 A * 4/1998 Kobayashi ................ 712/29

2004/0158333 A1 * 8/2004 Ha et al. ..................... 700/3
2007/0061496 A1 * 3/2007 Nishino ..................... 710/100

FOREIGN PATENT DOCUMENTS
JP    5-46549 A    2/1993

OTHER PUBLICATIONS
Translation of JP 05-046549 provided in the IDS.*

* cited by examiner

*Primary Examiner*—Pankaj Kumar
*Assistant Examiner*—Ajay P Cattungal
(74) *Attorney, Agent, or Firm*—Westerman, Hattori, Daniels & Adrian, LLP

(57) ABSTRACT

A serial communication system includes a master processor and a slave processor. A CS signal for requesting a serial communication is output from the master processor, and an OK_INV signal for responding to the CS signal is output from the slave processor. When a CS signal is an active state, the master processor executes a serial communications of a preset number of bits every time that a level of the OK_INV signal is reversed. The slave processor inverts a level of an OK_INV signal in response to the CS signal shifting to the active state. The slave processor changes the level of the OK_INV signal every time that a serial communication of a preset number of bits is completed.

6 Claims, 5 Drawing Sheets

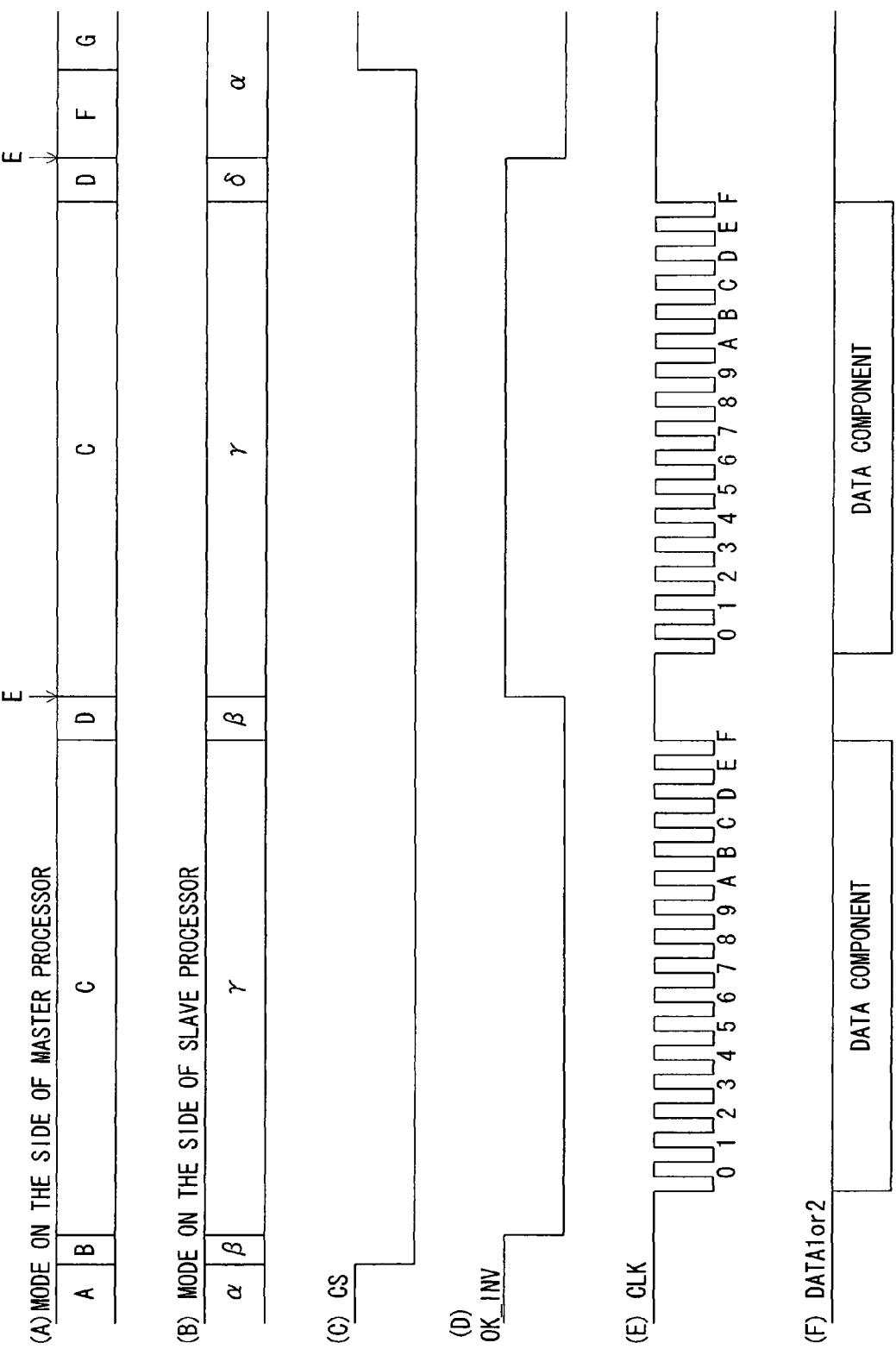

SERIAL COMMUNICATION SYSTEM

CROSS REFERENCE OF RELATED APPLICATION

The disclosure of Japanese Patent Application No. 2007-65973 is incorporated herein by reference.

BACKGROUND OF THE INVENTION

1. Field of the Invention

The present invention relates to a serial communication system. More specifically, the present invention relates to a serial communication system which performs a serial communication between a master processor and a slave processor.

2. Description of the Related Art

In the related art of a serial communication system of such a kind, a communication between a master microcomputer and a slave microcomputer is executed in a following manner.

First, the master microcomputer sets a communication request signal CDREQ to an L level in order to request a communication with the slave microcomputer. The slave microcomputer sets an answer signal CDRDY to an L level in order to respond to the communication request. The master microcomputer makes a CMCLK to an L level when the answer signal CDRDY of the L level is detected. The slave microcomputer determines that a communication is started by the L level of the CMCLK, and sets the answer signal CDRDY to an H level. The master microcomputer determines that a communication is started by the H level of the CDRDY, and starts a communication.

The master microcomputer sets the CMCLK to an H level and fetches data from the slave microcomputer. The slave microcomputer also fetches data from the master microcomputer when the CMCLK becomes the H level. The master microcomputer then sets next data to be transmitted, and sets the CMCLK to an L level. The slave microcomputer also sets next data when the CMCLK becomes the L level.

The slave microcomputer sets an answer signal CDRDY to an L level every time that data transfer of four bits data is completed. The slave microcomputer then sets next data to be transmitted and then sets the answer signal CDRDY to an H level. The master microcomputer confirms that the answer signal CDRDY becomes an L level every time that data transfer of four bits data is completed, and sets data to be transmitted next after the confirmation. The master microcomputer next sets the CMCLK to an H level by confirming that the answer signal CDRDY becomes the H level. Thereafter, the processing as described above is repeated.

After completion of data transfer of 4 bits×12 words, the slave microcomputer sets the answer signal CDRDY to an L level. The master microcomputer confirms that the answer signal CDRDY becomes the L level after completion of the data transfer of 4 bits×12 words, and sets the communication request signal CDREQ to an H level after the confirmation in order to complete the communication. The slave microcomputer confirms that the communication request signal CDREQ becomes the H level, and sets the answer signal CDRDY to an H level in order to end the communication.

However, the level of the answer signal CDRDY has to be changed between an L level and an H level at a start of the communication, at an end of the transfer of 4 bits data, and at an end of the transfer of 4 bits×12 words. Thus, in the related art, there is a problem of causing complicated processing.

SUMMARY OF THE INVENTION

Therefore, it is a primary object of the present invention to provide a novel serial communication system.

In one aspect of the present invention, a serial communication system comprising: a master processor for outputting a communication request signal to request a serial communication, and a slave processor for outputting an answer signal to respond to the communication request signal, wherein the master processor includes a communicator for executing a partial amount of serial communication every time that a level of the answer signal is changed when the communication request signal is an active state, and the slave processor includes a first changer for changing a level of the answer signal in response to the communication request signal shifting to the active state, and a second changer for changing a level of the answer signal every time that the partial amount of serial communication is completed.

A communication request signal for requesting a serial communication is output from a master processor, and an answer signal for responding to the communication request signal is output from a slave processor. The master processor includes a communicator, and the slave processor includes a first changer and a second changer. The communicator executes a partial amount of serial communication every time that a level of the answer signal is changed when the communication request signal is an active state. The first changer changes a level of the answer signal in response to the communication request signal shifting to the active state. The second changer changes a level of the answer signal every time that the partial amount of serial communication is completed.

That is, the slave processor changes the level of the answer signal when the communication request signal shifts to an active state, or when a partial amount of serial communication is completed. Furthermore, when the communication request signal is an active state, the master processor executes the partial amount of serial communication every time that the level of the answer signal is changed. This makes it possible to realize a simple and positive serial communication.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6(A) is an illustrative view showing one example of a shift of an operation mode of the master processor, FIG. 6(B) is an illustrative view showing one example of an operation mode of the slave processor, FIG. 6(C) is a waveform chart showing one example of a change of a CS signal, FIG. 6(D) is a waveform chart showing one example of a change of an OK_INV signal, FIG. 6(E) is a waveform chart showing one example of a change of CLK signal, and FIG. 6(F) is an illustrative view showing one example of a data communication operation.

DETAILED DESCRIPTION OF THE PREFERRED EMBODIMENTS

Figure 1:
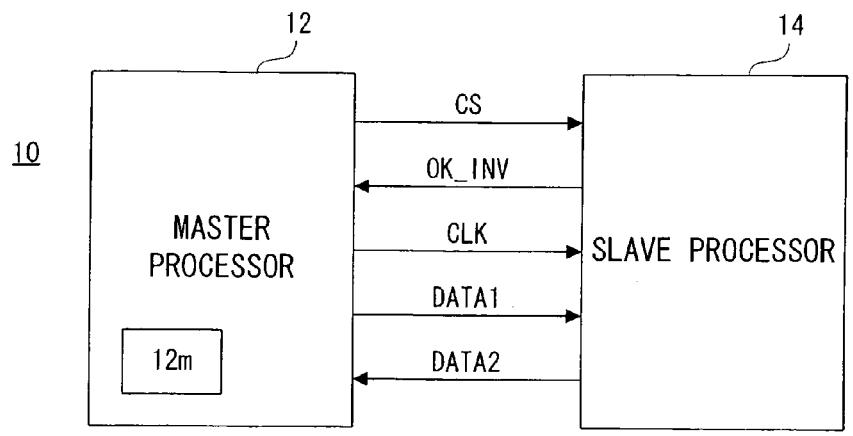
FIG. 1 is a block diagram showing a configuration of one embodiment of the present invention.

Referring to FIG. 1, a serial communication circuit 10 of this embodiment includes a master processor 12 and a slave processor 14. The master processor 12 outputs a CS signal, a CLK signal and DATA1 to the slave processor 14, and the slave processor 14 outputs an OK_INV signal and DATA2 to the master processor 12.

Here, the CS signal is a communication request signal for requesting a serial communication to the slave processor 14, and makes pulse-like changes between an H level (=negative level) and an L level (=active level). The OK_INV signal is an answer signal for responding to a communication request from the master processor 12, and makes pulse-like changes between an H level and an L level. Each of the DATA1 and DATA2 is data to be transferred by a serial communication. The CLK signal is a clock for controlling communication timing for each bit.

Figure 2:
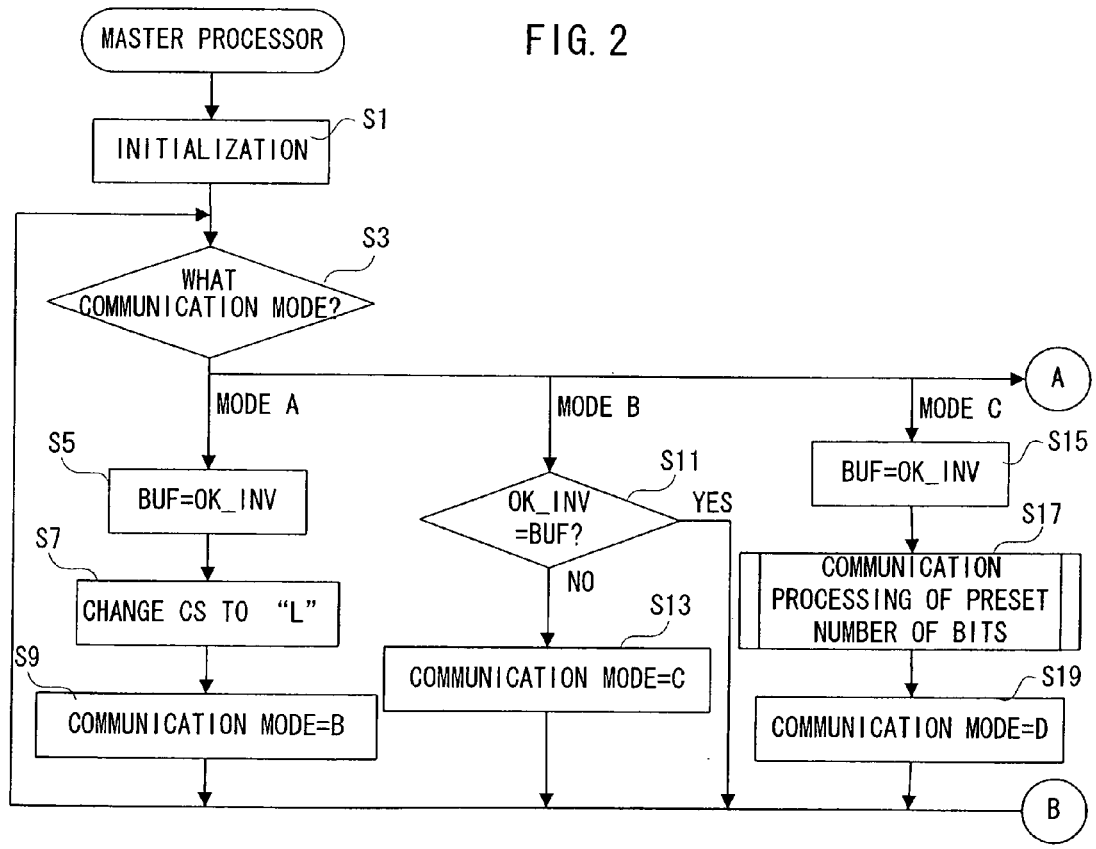
FIG. 2 is a flowchart showing a part of an operation of a master processor applied to FIG. 1 embodiment.
Figure 3:
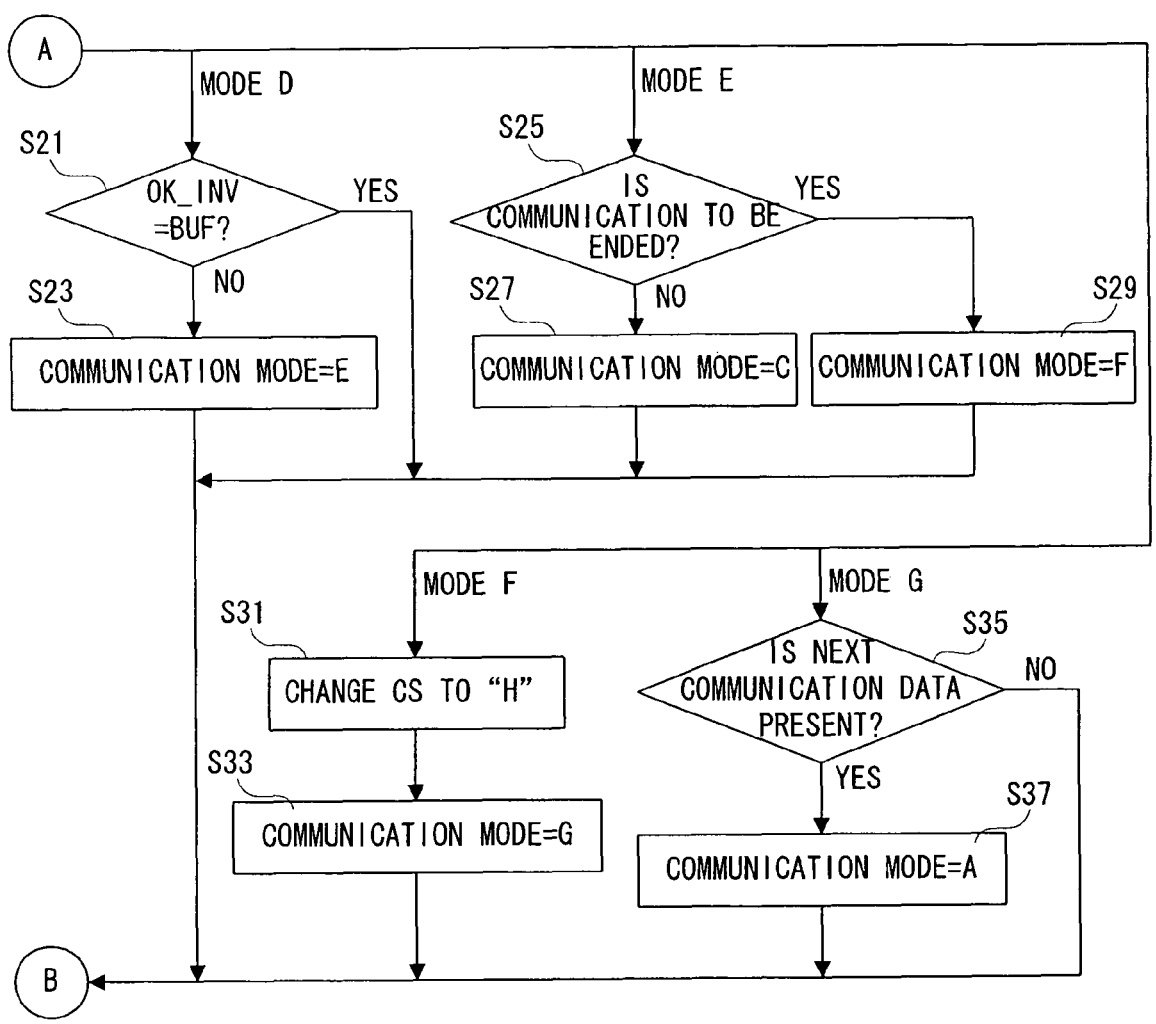
FIG. 3 is a flowchart showing another part of the operation of the master processor applied to FIG. 1 embodiment.
Figure 4:
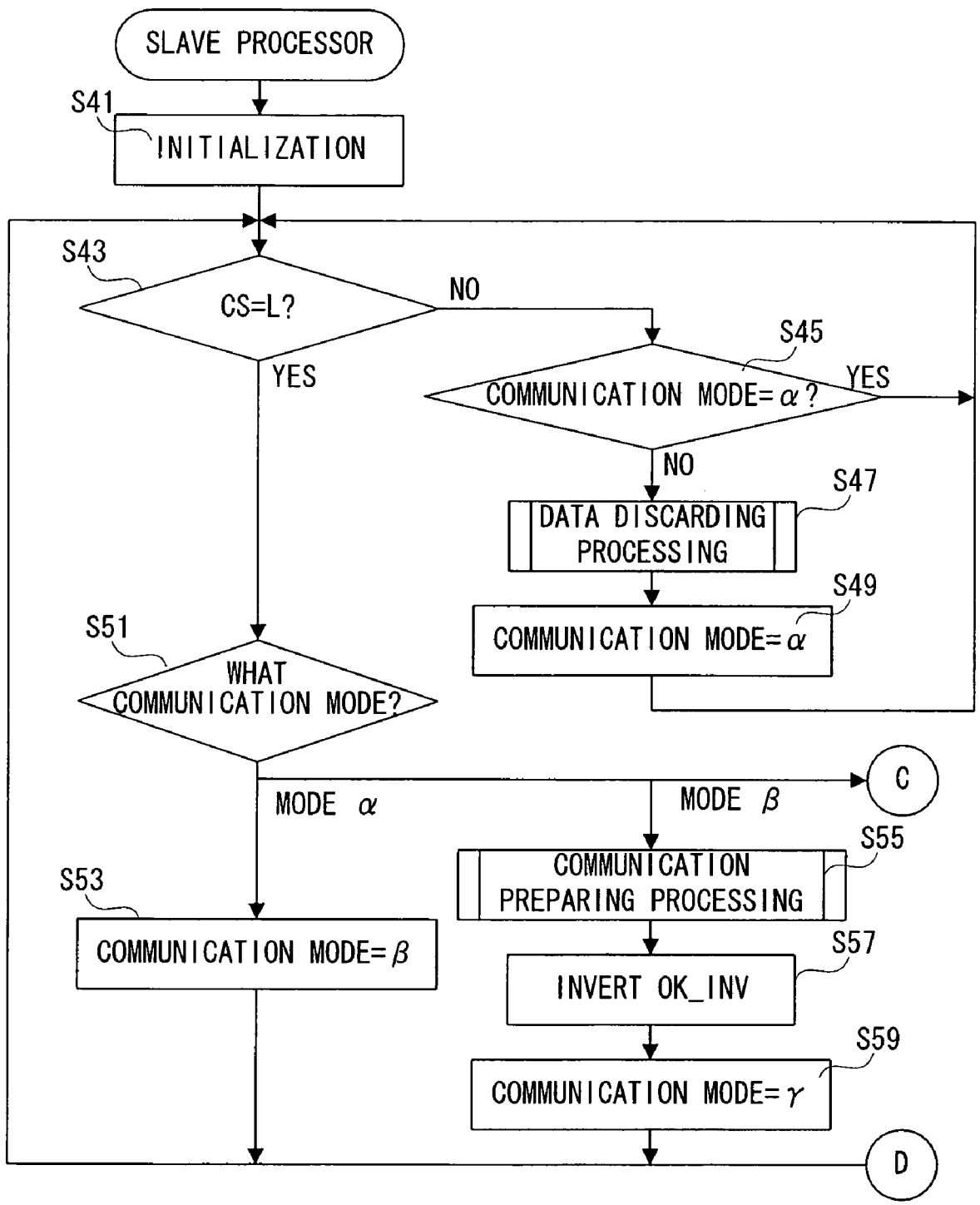
FIG. 4 is a flowchart showing a part of an operation of a slave processor applied to FIG. 1 embodiment.
Figure 5:
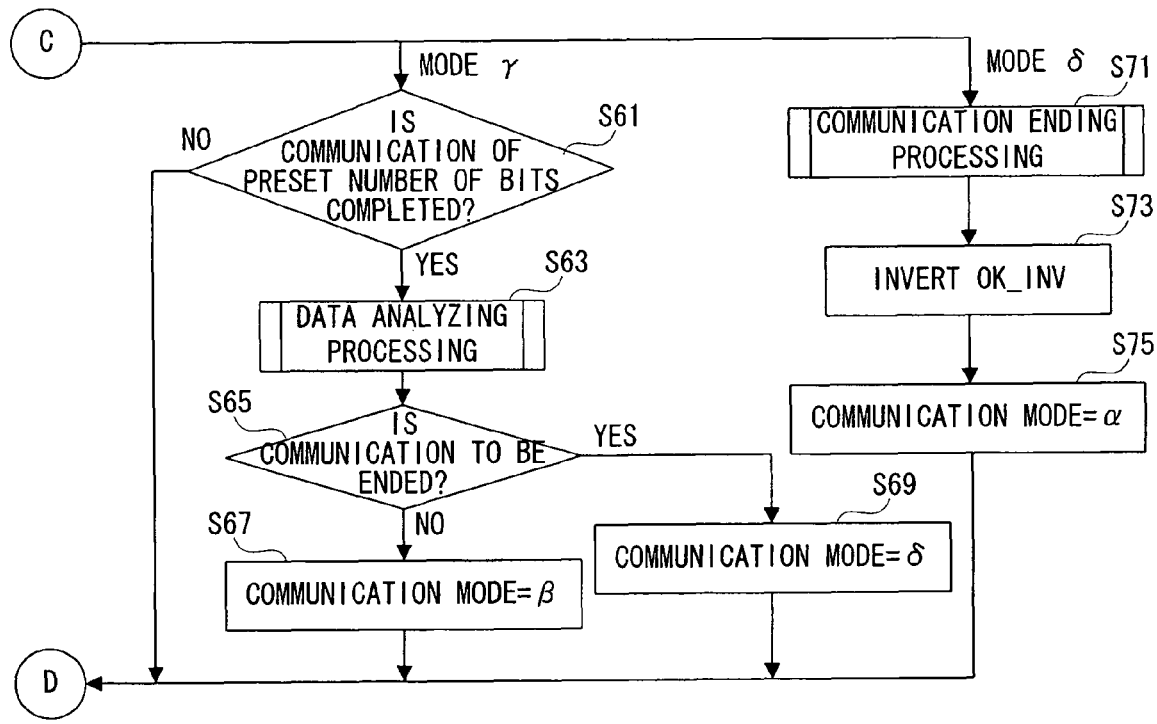
FIG. 5 is a flowchart showing another part of the operation of the slave processor applied to FIG. 1 embodiment.

The master processor 12 executes processing according to a flowchart shown in FIG. 2-FIG. 3, and the slave processor 14 executes processing according to a flowchart shown in FIG. 4-FIG. 5. A control program corresponding to these flowcharts is stored in a flash memory not shown.

Referring to FIG. 2-FIG. 3 relating to the processing of the master processor 12, initializing processing is executed in a step S1. This makes a communication mode set to a mode G. In a step S3, a communication mode currently set is determined. If the current communication mode is a mode A, the process proceeds to a step S5, and if a current level of the OK_INV signal is stored in a buffer memory 12m. In a step S7, the CS signal is set to an L level, and in a step S9, the communication mode is changed to a mode B. After completion of the processing in the step S9, the process returns to the step S3.

If a current communication mode is the mode B, the process proceeds to a step S11 to determine whether or not a current level of the OK_INV signal is the same as the level stored in the buffer memory 12m. If "YES" here, the process returns to the step S3 as it is while if "NO", the communication mode is changed to a mode C in a step S13, and then, the process returns to the step S3.

If a current communication mode is the mode C, the process proceeds to a step S15 to store a current level of the OK_INV signal in the buffer memory 12m. In a step S17, a serial communication of a preset number of bits (=16 bits) is executed with the slave processor 14. After completion of executing a serial communication of the preset number of bits, the communication mode is changed to a mode D in a step S19, and the process returns to the step S3.

If a current communication mode is the mode D, processing similar to the above-described step S11 is executed. If a current level of the OK_INV signal is the same as the level stored in the buffer memory 12m, the process returns to the step S3 as it is. On the contrary thereto, if a current level of the OK_INV signal is different from the level stored in the buffer memory 12m, the communication mode is changed to a mode E in a step S23, and the process returns to the step S3.

If a current communication mode is the mode E, the process proceeds to a step S25 to determine whether or not a serial communication is to be ended (=end condition is satisfied). If "NO" here, the communication mode is changed to the mode C in a step S27 while if "YES", the communication mode is changed to a mode F in a step S29. After completion of the processing in the step S27 or S29, the process returns to the step S3.

If a current communication mode is the mode F, the process proceeds to a step S31 to change the CS signal to an H level. In a step S33, the communication mode is changed to the mode G, and then, the process returns to the step S3.

If the current communication mode is the mode G, the process proceeds to a step S35 to determine whether or not next communication data exists. If "NO" here, the process returns to the step S3 while if "YES", the communication mode is changed to the mode A in a step S37, and then, the process returns to the step S3.

Referring to FIG. 4-FIG. 5 in relation to the processing of the slave processor 14, in a step S41, initializing processing is executed. This makes the communication mode set to a mode α. In a step S43, it is determined whether or not a level of the CS signal applied from the master processor 12 is an L level. If "NO" here, the process proceeds to a step S45 while if "YES", the process proceeds to a step S51.

In the step S45, it is determined whether or not a current communication mode is the mode α. If "YES" here, the process returns to the step S45 as it is. If "NO", data discarding processing is executed in a step S47, the communication mode is changed to the mode α in a step S49, and then, the process returns to the step S43.

In the step S51, a communication mode currently set is determined. If the current communication mode is the mode α, the communication mode is changed to a mode β in a step S53, and then, the process returns to the step S43. If a current communication mode is the mode β, communication preparing processing is executed in a step S55, a level of the OK_INV signal is inverted in a step S57, and the communication mode is changed to a mode γ in a step S59. After completion of the processing in the step S59, the process returns to the step S43.

If a current communication mode is the mode γ, it is determined whether or not a serial communication of the preset number of bits is completed in a step S61. If "NO" here, the process returns to the step S43 while if "YES", the process proceeds to a step S63. In the step S63, data analyzing processing is executed, and in a step S65, it is determined whether or not the serial communication is to be ended (end condition is satisfied).

In the DATA1 of the preset number of bits to be transferred last, an instruction to end the serial communication is described, and the end instruction is detected by the data analyzing processing in the step S63. In the step S65, as long as the end instruction is detected, "NO" is determined, and when the end instruction is detected, "YES" is determined.

If "NO" in the step S65, the communication mode is changed to the mode β in a step S67, and if "YES" in the step S65, the communication mode is changed to a mode δ in a step S69. After completion of the processing in the step S67 or S69, the process returns to the step S43.

If the current communication mode is the mode δ, communication end processing is executed in a step S71, and a level of the OK_INV signal is inverted in a step S73. After completion of the processing in the step S73, the communication mode is changed to the mode α in a step S75, and then, the process returns to the step S43.

Further referring to FIG. 6(A)-FIG. 6(F), when starting a serial communication, the master processor 12 sets a communication mode to the mode A (S37), and then changes a level of the CS signal from an H level to an L level (S7). The master processor 12 then changes the communication mode to the mode B (S9).

The slave processor 14 changes the communication mode from the mode α to the mode β in response to the CS signal being changed from the H level to the L level (S53). The slave processor 14 then inverts a level of the OK_INV signal (S57), and changes the communication mode to the mode γ (S59).

The master processor 12 changes the communication mode to the mode C in response to the level of the OK_INV signal being inverted (S13), and executes a serial communication of the preset number of bits (S17). After completion of the serial communication of the preset number of bits, the master processor 12 changes the communication mode to the mode D (S19).

The slave processor 14 determines whether or not a serial communication is to be ended every time that a serial communication of the preset number of bits is completed (S65), and changes the communication mode to the mode β when the serial communication is to be continued (S67). The level of the OK_INV signal is inverted after the change to the mode β (S57).

The master processor 12 changes the communication mode to the mode E in response to the level of the OK_INV signal being inverted (S23), and determines whether or not the serial communication is to be ended (S25). When the serial communication is to be continued, the master processor 14 changes the communication mode to the mode C (S27). Consequently, a serial communication of the preset number of bits is executed again (S17), and then, the communication mode is changed to the mode D (S19).

The slave processor 14 changes the communication mode to the mode δ when the serial communication is to be ended (S69), and executes communication ending processing (S71). The slave processor 14 then inverts a level of the OK_INV signal (S73) to change the communication mode to the mode α.

The master processor 12 changes the communication mode to the mode F when the serial communication is to be ended (S29). The master processor 12 further changes the level of the CS signal from an L level to an H level (S31), and changes the communication mode to the mode G.

As understood from the above description, a CS signal (communication request signal) for requesting a serial communication is output from the master processor 12, and an OK_INV signal (answer signal) in response to the CS signal is output from the slave processor 14. The master processor 12 executes a serial communication of the preset number of bits every time that the level of the OK_INV signal is inverted when the CS signal is in an active state (=L level state) (S17). The slave processor 14 inverts the level of the OK_INV signal in response to the CS signal shifting to the active state (S53, S57). The slave processor 14 further changes the level of the OK_INV signal every time that a serial communication of the preset number of bits is completed (S67, S57).

That is, the slave processor 14 inverts the level of the OK_INV signal when the CS signal shifts to the active state, or when a serial communication of the preset number of bits is completed. Furthermore, the master processor 12 executes a serial communication of the preset number of bits every time that the level of the OK_INV signal is inverted when the CS signal is the active state. Thus, it is possible to realize a simple and reliable serial communication.

In addition, an interrupt signal processing in the master processor 12 is not required, and there is no need of detailed time regulation in a communication. In turn, in the master processor 12 and the slave processor 14, a regulation of a processing speed is not required, and there is no waiting time in a communication standard, so that a high-speed communication is possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A serial communication system comprising:
    a master processor which requests a serial communication by making a communication request signal in an active state, and
    a slave processor which outputs an answer signal to respond to said communication request signal, wherein
    said slave processor includes a preparer which performs a preparation of a partial amount serial communication, and a first reverser which reverses a level of said answer signal every time that said preparation of said partial amount of serial communication is completed by said preparer, and
    said master processor includes a communicator which performs the partial amount of serial communication in response to the level of said answer signal is reversed when said communication request signal is in the active state.

2. A serial communication system according to claim 1, wherein said master processor includes a first determiner which determines whether or not an end condition is satisfied in response to the level of said answer signal is reversed before said partial amount of serial communication is performed, and a setter which sets said communication request signal in a negative state when it is determined that said end condition is satisfied by said first determiner.

3. A serial communication system according to claim 2, wherein said slave processor further includes a second determiner which determines whether or not said end condition is satisfied every time that said partial amount of serial communication is completed, and an ender which executes end processing when it is determined by said second determiner that said end condition is satisfied.

4. A serial communication system according to claim 3, wherein said second determiner executes determining processing with reference to a description of data to be transferred by said partial amount of serial communication.

5. A serial communication system according to one of claim 3 or 4, wherein said slave processor further includes a second reverser which reverses a level of said answer signal in relation to said end processing.

6. A serial communication method executed by a master processor which requests a serial communication by making a communication request signal in an active state, and a slave processor which outputs an answer signal to respond to said communication request signal, including following steps of: a preparing step, executed by said slave processor, of preparing a partial amount of serial communication; a reversing step, executed by said slave processor, of reversing a level of said answer signal every time that said preparation of said partial amount of serial communication is completed in said preparing step, and a communicating step, executed by said master processor, of performing the partial amount of serial communication in response to the level of said answer signal is reversed when said communication request signal is in the active state.

* * * * *